United States Patent [19]

Hatch

[11] Patent Number: 4,767,957
[45] Date of Patent: Aug. 30, 1988

[54] LIQUID METAL COLLECTOR FOR ACYCLIC GENERATOR

[75] Inventor: Burton D. Hatch, Ballston Lake, N.Y.

[73] Assignee: General Electric Company, Pittsfield, Mass.

[21] Appl. No.: 939,501

[22] Filed: Dec. 8, 1986

[51] Int. Cl.$^4$ .............................................. H02K 31/00
[52] U.S. Cl. ..................................... 310/178; 310/11; 310/219; 310/248
[58] Field of Search ............... 310/178, 219, 232, 148, 310/11, 102 A, 45; 322/48; 318/253; 439/5, 17; 417/50

[56] References Cited

U.S. PATENT DOCUMENTS

| | | | |
|---|---|---|---|
| 4,168,446 | 9/1979 | Hatch | 310/219 |
| 4,186,321 | 1/1980 | Marshall | 310/178 |
| 4,207,486 | 6/1980 | Hatch | 310/178 |
| 4,241,272 | 12/1980 | Marshall | 310/178 |
| 4,241,273 | 12/1980 | Hatch | 310/219 |
| 4,266,154 | 5/1981 | Marshall | 310/219 |
| 4,284,918 | 8/1981 | Cannell et al. | 310/178 |
| 4,314,171 | 2/1982 | Hatch | 310/219 |
| 4,347,456 | 8/1982 | Chabrerie | 310/219 |
| 4,483,574 | 11/1984 | Chabriere | 310/219 |
| 4,712,032 | 12/1987 | Hatch | 310/219 |

FOREIGN PATENT DOCUMENTS 0471633 9/1975 U.S.S.R. .............................. 310/219

Primary Examiner—R. Skudy
Attorney, Agent, or Firm—Bailin L. Kuch; Robert A. Cahill

[57] ABSTRACT

A plurality of circumferentially spaced, compliant, braided metal filament brushes are mounted by the stator of an acyclic generator for extension from the stator collector surface across the liquid metal collector gap into virtual contact with the rotor collector surface. These brushes are each of an axial length corresponding to the axially lengths of the stator and rotor conductive collector surfaces and serve to effectively block the magnetohydrodynamically induced, counter-rotational, circumferential flow of liquid metal in the collector gap, thus eliminating the component of viscous rotor drag otherwise occasioned thereby.

8 Claims, 2 Drawing Sheets

LIQUID METAL COLLECTOR FOR ACYCLIC GENERATOR

BACKGROUND OF THE INVENTION

The present invention relates to high DC current acyclic or homopolar generators and particularly to an improved liquid metal collector therefor.

A goal of present research and development efforts is to develop smaller, ultra-high current acyclic generators of dramatically increased power density. To this end, high current density field coils, such as supercooled or superconducting field coils, are utilized to provide the requisite high density magnetic field. This coupled with dramatic increases in the peripheral velocity of the rotor can develop DC current outputs in the megamp range. To accommodate such high DC current magnitudes and peripheral velocities, liquid metal collectors are a virtual necessity to reliably handle current transport between the rotor and stator of the generator.

At such high currents and peripheral velocities, control of the liquid metal, typically a sodium-potassium eutectic (NaK), becomes extremely difficult due to the myriad forces acting on the liquid metal. Obviously, the liquid metal must continuously wet the rotor and stator collector surfaces and completely fill the gaps therebetween to avoid arcing and undue losses. In addition, the current carried by the liquid metal, coupled with the physical agitation thereof during high current, high velocity generator operation, generates considerable heat in the liquid metal, which heat must be removed if it is not to raise the liquid metal's resistivity and thus increases losses. Thus, it is important that the liquid metal be continuously removed from the collector regions, cooled and returned thereto in recirculating fashion, all without creating voids in the gaps between collector surfaces.

Complicating these objectives is the force exerted on the liquid metal resulting from the interaction of the generator current flowing therethrough and the magnetic field associated therewith. This outwardly directed Lorentz force tends to drive the liquid metal out of the collector gaps and is a direct function of the current magnitude. Thus, as the generator current is increased, Lorentz expulsion forces become a significant factor. In addition, the gererator current coacts with the component of the generator magnetic field existing in the collector gap which is normal to the current path therethrough to develop forces driving the liquid metal in a circumferential direction opposite to the direction of rotor rotation.

In addition to the above-noted magnetochydrodynamic motoring forces acting on the liquid metal in the collector gaps, mechanical forces exerted on the liquid metal due to the high rotational velocity of the rotor must also be taken into consideration. First, there is a viscous pumping force which tends to drive the liquid metal in the same circumferential direction in which the rotor collector surface is moving. Thus, this torquing force acts in the opposite circumferential direction to the magnetohydrodynamic forces generated by the coaction of the generator current and the generator field in the collector gaps. At zero generator current, this viscous torquing or pumping force causes the liquid metal in the collector gaps to revolve circumferentially at velocity equal to one-half of the rotor peripheral velocity. As generator current is increased, so does the counteracting circumferential magnetohydrodynamic force. At some current value, circumferential motion of the liquid metal will be halted, and at higher values, the liquid metal will be driven in a direction opposite to the direction of rotor rotation. Such counter-rotation of the liquid metal significantly increase viscous drag on the rotor, resulting in higher losses.

Finally, there are the radially directed, viscous centrifugal pumping forces acting on the liquid metal due to the rotational motion of the rotor surfaces in contact therewith.

It is seen that these liquid metal pumping or motoring forces vary with generator current and rotor velocity. Thus, it becomes extremely difficult to develop a design capable of affording the requisite control of the liquid metal over a wide range of operating conditions from zero to rated generator current and zero to rated rotor velocity.

In addition to the foregoing considerations, it would be desirable to utilize these magnetohydrodynamic and mechanical forces to recirculate the liquid metal through the collector region and thus avoid the added complexity and cost of an external pump to move the liquid metal in a recirculating path through the collector gaps.

It is accordingly an object of the present invention to provide an improved liquid metal collector for an acyclic generator.

A further object is to provide a liquid metal collector of the above-character, wherein viscous drag on the generator rotor is minimized.

An additional object is to provide a liquid metal collector of the above-character, wherein the inherent forces acting on the liquid metal are advantageously harnessed to achieve recirculation of the liquid metal through the collector region.

Yet another object is to provide a liquid metal collector of the above-character, wherein recirculation of the liquid metal through the collector region pursuant to extracting heat therefrom is achieved without resort to an external recirculating pump.

A still further object is to provide a liquid metal collector of the above-character of improved efficiency and capable of handling extremely high power densities.

Another object is to provide a liquid metal collector of the above character which is efficient in design and reliable in operation over a wide range of operating conditions and over a long service life.

Other objects of the invention will in part be obvious and in part appear hereinafter.

SUMMARY OF THE INVENTION

In accordance with the present invention, there is provided an improved liquid metal collector for an acyclic generator wherein the circumferential forces acting on the liquid metal are controlled such as to minimize viscous rotor drag without jeopardizing the recirculation of the liquid metal through the collector gap pursuant to the extraction of heat therefrom. To this end, a plurality of circumferentially spaced, compliant, braided metal filament brushes are mounted by the stator for extension from the stator collector surface across the collector gap into virtual contact with the rotor collector surface. These brushes, of an axial length corresponding to the axial lengths of the stator and rotor conductive collector surfaces in the main generator current path are uniformly distributed about the circumference of the annular collector gap. As a consequence, these brushes, which serve with the liquid metal in the transport of generator current across the collector gap, are positioned to effectively block the magnetohydrodynamically induced, counter-rotational, circumferential flow of liquid metal in the collector gap and thus eliminate the component of viscous rotor drag otherwise occasioned thereby. Moreover, by virtue of the angular or circumferential spacing of the brushes, a multiplicity of axially directed passages are provided between adjacent brushes for the circulation therethrough of liquid metal motivated by the Lorentz pumping forces acting thereon.

The invention accordingly comprises the features of construction, combination of elements and arrangement of parts which will be exemplified in the construction hereinafter set forth, and the scope of the invention will be indicated in the claims For a fuller understanding of the nature and objects of the invention, reference should be had to the following detailed description taken in conjunction with the accompanying drawings, in which:

FIG. 1 is a fragmentary, sectional view of an acyclic generator incorporating a liquid metal collector constructed in accordance with the present invention; and FIG. 2 is a sectional view taken along line 2—2 of FIG. 1.

Corresponding reference numerals refer to like parts throughout the several views of the drawings.

DETAILED DESCRIPTION

Figure 1:
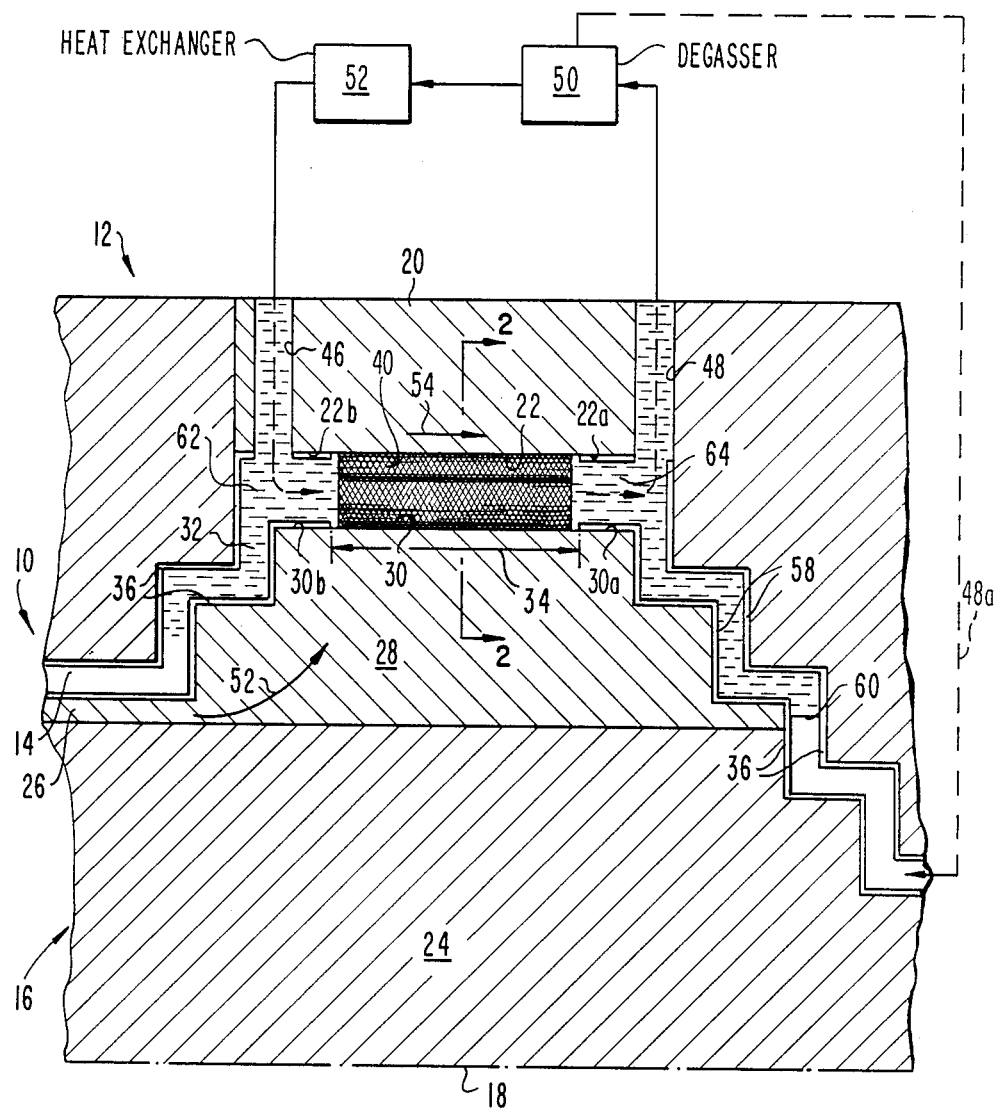

Referring to FIG. 1, an acyclic or homopolar generator, generally indicated at 10, includes a stator, generally indicated at 12, having a bore 14 accommodating a rotor generally indicated at 16 and journalled for rotation about an axis 18 by suitable bearings (not shown). The stator includes a terminal member 20 of highly conductive metal, such as copper, which is provided with an annular collector surface 22. The rotor may be entirely made of a lightweight, highly conductive, solid cylinder of aluminium (or aluminium-beryllium alloy) or may include an iron core 24 for carrying the magnetic flux generated by field coils (not shown). Mounted on any such iron rotor core is a highly conductive metallic sleeve or cylinder 26 of copper or aluminium for carrying the main generator current. Integrally formed at each end of cylinder 26 (the right end being shown in FIG. 1) is an annular rotor collector member 28 which presents a cylindrical collector surface 30 in uniformly gapped relation with stator collector surface 22. To accommodate main generator current transport between collector surfaces 22 and 30, the collector gap therebetween is filled with a highly conductive liquid metal 32, such as a sodium-potassium eutectic (NaK). The surfaces of the stator and rotor to each side of this collector gap are fashioned in closely spaced stepped formation relation for purposes ascribed below. Except for the axial segments 34, the conforming collector surfaces of the stator aid rotor are covered with an insulative coating 36, which may take the form of sprayed alumina which is subsequently vacuum impregnated with epoxy. Consequently, current transport between the stator and rotor is limited to the welldefined axial segments 34 of the stator and rotor cylindrical collector surfaces 22 and 30, respectively, which are devoid of insulative coating 36, and the liquid metal 32 filling the annular collector gap therebetween.

Figure 2:
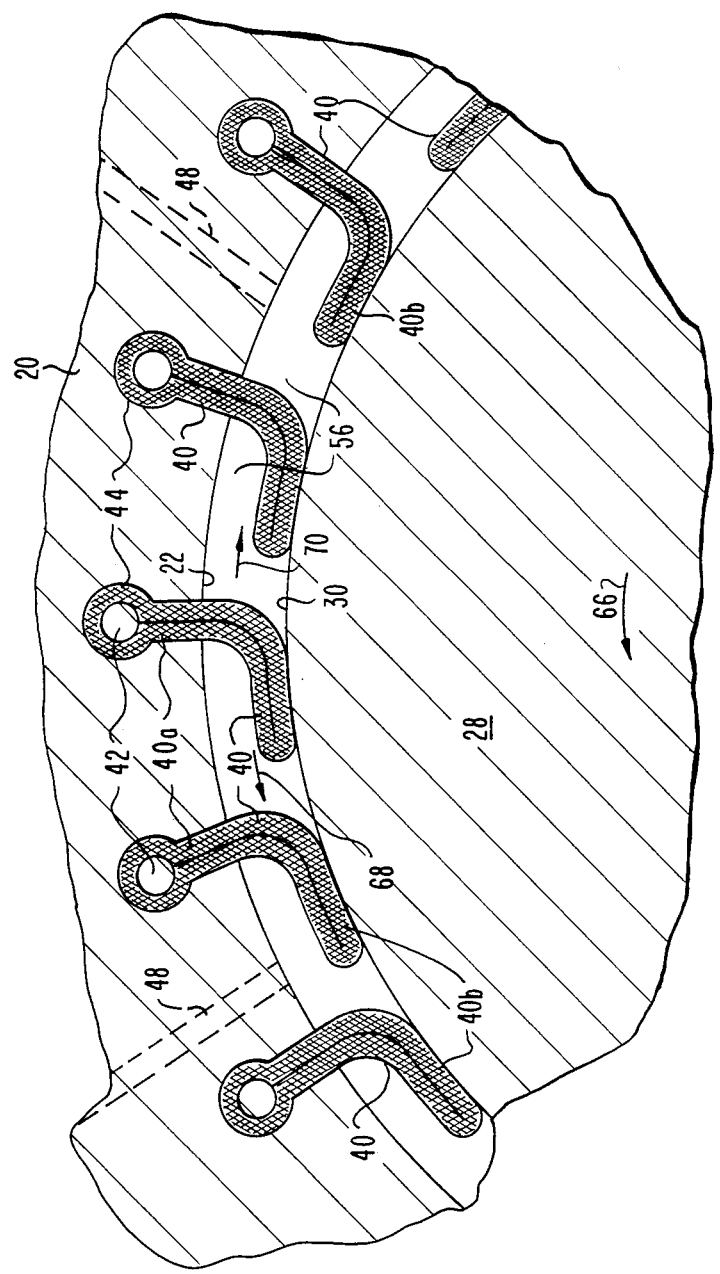

In accordance with the present invention, a pherality of brushes 40 are uniformly angularly spaced about the circumference of this annular collector gap, as best seen in FIG. 2. These brushes are preferably formed of a compliant mesh of conductive metal filaments in an approximate L-shaped configuration with the radially outer legs 40a thereof mounted by stator terminal member 20. The free, radially inner legs 40b thereof are initially disposed in rubbing, tangential relation with the conductive rotor collector surface 30 over the axial segment 34 thereof. Brush legs 40b are seen to extend from brush legs 40b. in the direction of rotor collect surface movement indicated by arrow 66 in FIG. 2. Each brush may be comprised of flat copper braid which is flattened and folded over on itself to a double thickness before being formed in the illustrated L-shaped configuration. The brush filaments must be fully compatible with liquid metal 32 and wettable with the liquid metal so as to provide a very low resistivity. While tin plated copper braid is preferred, other braided (or otherwise compliant) conductive materials may be used. Also, various surface finishes, such as electroplated gold, silver, tin, nickel, etc., may be applied to the braided filaments to enhance wettability with the liquid metal.

While brushes 40 may be mounted to the stator terminal member 20 in several ways, such as by electron beam welding the legs 40a thereto while being lodged in radial slots formed in stator collector surface 22, FIG. 2 illustrates that the copper braid is folded about a conductive metal dowel 42 and captured in keyhole-shaped grooves 44 formed in the stator and opening into stator collector surface 22. It will be appreciated that the brushes may be mounted by the rotor instead.

Returning to FIG. 1, liquid metal 32 is supplied to the annular collector gap via one or more inlet passages 46 to the inboard side of the collector gap and withdrawn therefrom via one of more outlet passages 48 formed in stator 12 to the outboard side of the collector gap. These passages are connected in a liquid metal recirculating loop which includes a degasser 50 and a heat exchanger 52. Degasser 50 removes any inert cover gas, such as nitrogen, entrained in the liquid metal and returns the recovered gas, as indicated diagrammatically at 48a, to the gap between the stator and rotor where it exerts a pressure to prevent escape of the liquid metal axially beyond the stepped formation to each side of the collector region. The heat exchanger extracts heat from the liquid metal prior to its return to inlet passages 46 and the collector gap.

As is well understood in the art, while generator current is flowing radially through the collector gap, leading from a path in rotor 16 generally indicated by arrow 52, the interaction of this current and its (i.e. the circumferential magnetic field produced by this same current) magnetic field generates a force on the liquid metal 32 within the collector gap between the uninsulated collector surfaces 22, 30 which is to the right or in the outboard direction indicated by arrow 54 in FIG. 1. This Lorentz force is utilized to advantage to propel the liquid metal axially through the collector gap from the inlet passager 46 toward the outlet passages 48. This liquid metal flow is not impeded by brushes 40 since, as seen in FIG. 2, the spaces between the brushes provide a multiplicity of unobstructed, axially oriented channels 56. That this Lorentz pumping force increases with increasing generator current magnitude is used to advantage in providing enhance axial liquid metal flow through the collector gap when most needed to achieve a cool running liquid metal collector.

Acting in opposition to the Lorentz pumping forces are the viscous centrifugal pumping forces exerted on the liquid metal in the annular gaps between the complimenting stairstep formations 58 in the stator and rotor to the outboard or right side of the collector gap as seen in FIG. 1 during high velocity rotation of rotor 16. Supplementing these centrifugal viscous pumping forces is the cover gas pressure existing at liquid metal-gas interface 60.

It is desirable to achieve a balance point between these opposing dynamic pumping heads which is located approximately at the entries into outlet passages 48 and thus provide an effective hydrostatic pumping head propelling the liquid metal in the desired recirculating path through passages 48, degasser 50, heat exchanger 52 and inlet passages 46. To this end, insulative coating 36 is extended onto the marginal portions 22a and 30a of the stator and rotor collector surfaces, respectively, to an extent necessary to isolate the liquid metal proximate the entries into passages 48 from the highest level of generator current conducted across the collector gap, taking into account fringing current paths at the right edge of axial extent 34. Thus, this portion of the liquid metal is not subjected to Lorentz forces, and consequently the Lorentz dynamic head existing in the collector gap encompassed by axial segments 34 is converted to a hydrostatic head substantially at or somewhat to the inboard or left of the passage 48 entries.

It will be noted in FIG. 1 that the insulative coating 36 is also extended onto the inboard marginal surface portions 22b and 30b of the stator and rotor collector surfaces, respectively. As a consequence, brushes 40 are axially spaced from the exits of inlet passages 46. There is thus provided an unobstructed annular chamber 62 which serves as an inlet manifold affording inlet passages 46 fluid communication with the multiplicity of axial channels 56. It will be noted that the liquid metal in chamber 62 is essentially free of magnetohydrodynamic effects, i.e., the Lorentz pumping forces and the circumferential pumping forces generated by coaction of the generator current and the axial component of the generator field existing in the collector gap. Thus, the dominate pumping force acting on the liquid metal in chamber 62 is the viscous drag circumferential pumping force generated by the rapidly rotating rotor surface bounding the chamber. This pumping force is utilized to advantage in rapidly distributing the cooled liquid metal supplied via the inlet passages throughout annular chamber 62 prior to its flow into the collector gap.

The same is true at the outboard end of the collector region in that brushes 40 are axially spaced from the entries into outlet passages 48. Thus there is provided unobstructed annular chamber 64 which serves as an outlet manifold affording axial channels 56 open fluid communication with the outlet passages 48. Similarly, viscous circumferential pumping forces distribute the liquid metal exiting axial channels 56 throughout annular chamber 64 preparator to its being pumped out via outlet passages 48 by the hydrostatic pressure head therein.

Considering the circumferential liquid metal pumping forces to which the brushes 40 are addressed, rotation of the rotor 16 in the assumed counterclockwise direction indicated by arrow 66 in FIG. 2 produces viscous pumping forces on the liquid metal 32 also in the counterclockwise direction, as indicated by arrow 68. With the transport of generator current through the liquid metal in the collector gap encompassed by axial segments 34, the coaction of this current with the axial component of the generator magnetic field in the collector gap produces a magnetohydrodynamic pumping force in the clockwise direction, indicated by arrow 70. It is seen that these two liquid metal pumping forces are in opposition, and at high generator currents, the magnetohydrodynamic pumping forces will dominate, causing the liquid metal in the collector gap to revolve in the clockwise direction, counter to the direction of rotor rotation. As a consequence, viscous drag on the rotor increases significantly, which represents added generator losses.

It is seen in FIG. 2 that brushes 40 are positioned to radially span the collector gap and serve as barriers to impede significant counter-rotational flow of the liquid metal in the collector gap in response to losses associated therewith are substantially avoided. While, at high generator current levels, there may be some degree of counter rotational movement of the liquid metal, it is limited to the individual channels 56 where the opportunity to reach significant velocities does not exist. Since the brushes 40 afford effective control of the circumferential movement of the liquid metal in the conductive portion (axial segments 34) of the collector gap, variations in rotor speed and generator current, insofar as their influences on circumferential liquid metal motion are concerned, do not significantly influence axial circulation of the liquid metal through the collector gap. Thus, the liquid metal collector may be designed to take maximum advantage of the axial Lorentz pumping forces and the radial centrifugal pumping forces to achieve the requisite recirculation of the liquid metal through the collector region and thus a cool running liquid metal collector.

It is thus seen that the objects set forth above, including those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

What is claimed as new and desired to secure by Letter Patent is:

1. A current collector for an acyclic generator having a stator and a rotor mounted for rotation about an axis, said current collector comprising, in combination:
   A. an annular stator collector surface formed in said stator.
   B. an annular rotor collector surface formed on said rotor for rotation coaxially relative to said stator collector surface, said rotor collector surface spaced from said stator collector surface to define an annular collector gap therebetween;
   C. a quantity of liquid metal filling said collector gap; and
   D. a plurality of barriers mounted by one of said stator and rotor for projection into said collector gap at angularly spaced locations about the circumference thereof, said barriers being of an axial extent corresponding to the axial extent of the path of current transport across said collector gap, whereby said barriers substantially impede counter-rotational movement of said liquid metal in said collector gap in response to magnetohydrodynamic circumferential pumping forces exerted on said liquid metal in said collector gap while permitting axial flow of said liquid metal between said barriers.

2. The current collector defined in claim 1, wherein said barriers are in the form of compliant brushes constructed of conductive metal filaments.

3. The current collector defined in claim 2, wherein said brushes are mounted by said stator.

4. The current collector defined in claim 3, wherein said brushes are generally L-shaped each having a first leg mounted by said stator for extension generally radially into said collector gap and a second leg disposed in substantial tangential relation with said rotor collector surface.

5. The current collector defined in claim 4 wherein said second legs of said brushes extend from said first legs thereof in the direction of rotation of said rotor collector surface.

6. The current collector defined in claim 5, wherein said first legs of said brushes are received in keyhole-shaped grooves formed in said stator and opening into said stator collector surface, said first leg of each said brush captured in a different one of said grooves by a conductive dowel.

7. The current collector defined in claim 5, which further includes insulative coatings applied to axially spaced marginal peripherial portions of said stator and rotor collector surfaces, said brushes spanning the axial spacing between said insulative coating.

8. The current collector defined in claim 7, which further includes at least one inlet passage formed in said stator axially to one side of said brushes and at least one outlet passage formed in said stator axially to the other side of said brushes, said passages accommodating the recirculation of said liquid metal axially through said collector gap between said brushes.

* * * * *